June 12, 1956 R. RUHNAU 2,749,798
FILM FEEDING MECHANISM FOR CINEMATOGRAPH APPARATUS
Filed April 21, 1952
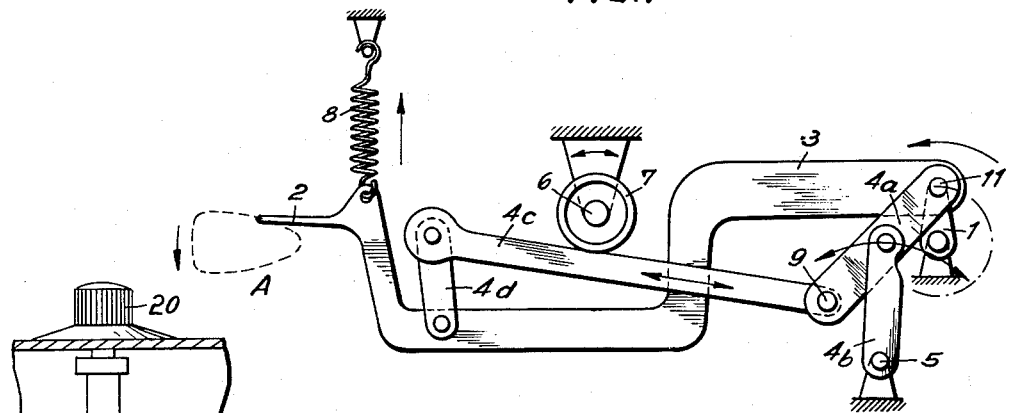
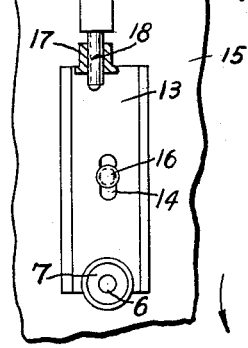
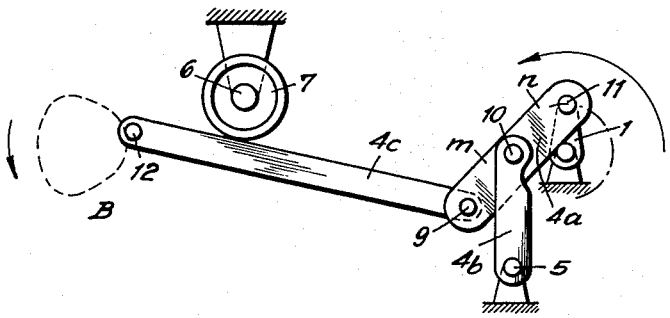
INVENTOR
R. Ruhnau United States Patent Office 2,749,798
Patented June 12, 1956

2,749,798

FILM FEEDING MECHANISM FOR CINEMATOGRAPH APPARATUS

Richard Ruhnau, Berlin-Tempelhof, Germany

Application April 21, 1952, Serial No. 283,323

Claims priority, application Germany April 21, 1951

9 Claims. (Cl. 88—18.4)

This invention relates to film feeding mechanism for cinematograph apparatus.

The control of a film feeding claw for cinematograph apparatus, in particular a projector, requires that suitable means are available to effect the necessary acceleration of the movement of the claw for the advance of the film. In particular for sub-standard films there are frequently used for this purpose curved components, such as Herz Eccentrics and the link which, however, have the defect that at the high speed of revolution entailed during operation they cause a loud and therefore a disturbing noise. In order to avoid this defect an attempt has been made to drive the claws solely through the agency of a connecting rod from a constantly rotating crank. In this case only every second or third oscillatory movement of the claws is utilised for movement of the film. Such claw mechanisms require a special control means by which the intermediate free running is brought about. This control means, for example a second crank, must consequently be driven at a speed corresponding to that of the crank mechanism operating the up and down movement of the claws. Even in such systems loud disturbing noises arise owing to the high rate of rotation of the necessary gear wheels and the violence of the oscillating movements of the entire claw mechanism.

Further it has also been tried to provide by means of only one continuously moving crank the accelerated shifting movement as well as the reciprocating movements of the claw in the one and in the other direction. Also the means necessary for performing this have disadvantage of loud disturbing noises besides of the further that shifting of the film starts with the highest value of acceleration and consequently the perforation of the film is subjected to the danger of damages.

The present invention has for its principal object the provision of an improved film feeding or claw mechanism which avoids the above mentioned defects. In particular it is an object of the invention to provide a mechanism which may be operated by the motion of a single constantly rotating crank and without objectionable noise.

A further object of the invention is to provide a film feeding mechanism which is operable if desired with either direction of movement of the film and in which the position of a picture frame can be shifted in a very simple manner.

In the improved mechanism of the invention the film engaging claws of a claw plate are caused to move in a circle by the operation of a crank and the motion of the claws is modified by a linkwork which is connected between the claw plate and the crank and is operated thereby.

A constructional example of a claw mechanism according to the invention is shown diagrammatically in the accompanying drawing in which:

Fig. 1 shows the entire claw mechanism,

Fig. 2 shows merely the auxiliary linkage, and,

Fig. 3 is an elevational view partly in cross section of the means whereby the vertical position of the roller can be adjusted.

A constantly rotating crank 1 imparts directly a circular movement to the claw plate 3 which carries the claw 2. The motion of the claw plate is controlled by an auxiliary linkage 4a, 4b, 4c which in its turn is also driven through the crank 1.

The auxiliary linkage consists of the link 4a, the swinging arm 4b and the link 4c. The transmission of the movement to the claw plate 3 can take place in various ways, for example by a further arm 4d which is pivotally connected both to the claw plate 3 and to the link 4c.

The mode of operation of the auxiliary linkage is shown in Fig. 2. The link 4a which is directly connected with the crank 1 is divided by the axes 9, 10, 11 into two sections $m$ and $n$. According to an important aspect of the invention, the length of section $m$ is not greater than ⅔rds of the stroke of the crank 1 which in its turn amounts to about 1.3 times the advance of the film per frame. The swinging arm 4b, the foot of which can pivot about the stationary point 5 is pivotally connected with the link 4a about the axis 10. The rotation of the crank 1 thus swings the free end (axis 9) of the section $m$ of the link 4a in a non-circular path, in which unequal accelerations occur. The maximum acceleration of the point 9 occurs, for example when the crank 1 is moving in the direction of the arrow, on the left side of the central vertical line i. e. when the crank is moving in the direction of the claw 2.

As the direction of motion of the axis 9 is contrary to that of the claw 2, the claw movement must be reversed in order to make it usable for advancing the film. This reversal is effected with a simultaneous further increase of the acceleration by the fact that the link 4c is pivoted with the free end of the lever 4a at the axis 9, and the link 4c is held against a roller 7 rotatable about the stationary point 6 by a spring 8 without, however, being hindered in its oscillating movement. On rotation of the crank 1 the point 12 at the free end of the link 4c swings, as shown in Fig. 2, in the same direction as the crank and with periodically varying acceleration in a non-circular path B. This path B, however, is unsuitable for advancing the film because it has no pronounced top and bottom culmination point.

It is a further feature of the invention that, by the transmission of this oscillating movement to the claw plate 3 the claw 2 already driven circularly by the crank 1, will move in a closed curve A which, as can be seen from Fig. 1, is eminently suitable for advancing the film.

It has been found of advantage not to allow the tension spring 8 to engage directly the link 4c but to connect the spring as shown with the end of the claw plate 3. By the arm 4d (see Fig. 1) which connects the claw plate 3 with the link 4c, the tension of the spring 8 is transmitted both to the claw plate 3 and to the link 4c and in this way any play in the mechanism is prevented from giving rise to objectionable noises.

The advantage of the claw mechanism according to the invention lies above all in the fact that both the claw plate proper and also the auxiliary linkage can swing freely in every phase of movement and further that every movement within the system is derived from a rotational movement: thus if the mechanism is accurately made no objectionable noise is produced. The control of the entire system by a single crank allows, furthermore, of a precision in the definition of the path of the claw which cannot be obtained for example in systems which are driven from two points. A further advantage of the mechanism according to the invention lies in the fact that the acceleration of the film advancing movement as well as the film advancing movement itself can be adjusted at will within wide limits by corresponding adjustment of the stationary rotating point 6. By raising or lowering this point 6, the centre position path of the claw can be changed relatively to a horizontal plane through the entire system so that in this way the shifting of the picture frame can be effected in a very simple manner.

The means for raising or lowering the point or axle 6 is best shown in Fig. 3 wherein the axle is connected to a vertically arranged shifting member 13. The member 13 is provided with a vertical slot 14 through which projects a pin 16 on wall 15 and the shifting member is guided by such pin and slot arrangement.

A nut 17 is carried by the upper end of the shifting member and engages a screw element 18 which is guided in a shell 19 carried by the wall 15. The upper end of the screw 18 is provided with a knurled operating head or the like 20 for rotating the screw 18.

Manifestly, through the manipulation of the head 20, the nut 17 moves either upwardly or downwardly respecting the screw depending upon the direction of rotation of the screw thus raising or lowering the position of the point 16 and the roller 7 by reason of the movement of the shifting member 13.

Further it is a feature of the mechanism according to the invention that a displacement at will of the stationary point 5 results in a deformation of the path of the claw. This feature of the mechanism provides the possibility of adjusting the claws in such a way that the path A of the claws has a horizontal axis of symmetry. The mechanism therefore allows both forward and also backward movement of the film under the same conditions.

I claim:

1. Film feeding mechanism comprising a claw plate having a claw at one end thereof, a single uniformly rotatable crank pivotally connected with said claw plate, a first link pivotally connected at one end with said crank, and at the other end with one end of a second link and at a point intermediate its ends with an arm mounted on a fixed pivot, means for biasing said second link at a point intermediate its ends against a circular abutment mounted on a fixed axis and means connecting the free end of said second link with the claw plate for transmitting the motion of the such end of said second link so that the swinging movement imparted to said second link is transmitted to the claw plate whereby the claw is constrained to effect a predetermined motion.

2. Film feeding mechanism comprising a claw plate, a single uniformly rotatable crank connected with said claw plate, a first link pivotally connected at one end with said crank, and at the other end with one end of a second link and at a point intermediate its ends with an arm rotatably mounted on a fixed pivot, a third link connecting the other end of said second link with said claw plate and spring means biasing said claw plate to hold said second link at a point intermediate its ends in engagement with a roller mounted on a relatively fixed axis.

3. Film feeding mechanism as claimed in claim 2 including means for adjusting the position of the axis of the roller relative to the said second link.

4. Film feeding mechanism comprising a claw plate having claws for engaging and moving a film, a rotatable crank having a throw approximately 1.3 times the desired film movement, a first link pivotally connected at one end with said crank, at the other end with one end of a second link and at a point intermediate its ends with one end of an arm the other end of which is mounted on a fixed pivot, the distance between the pivoted axis of the connections of said first link with said second link and with said arm being not greater than ⅔rds of the throw of the said crank, means connecting the other end of said second link with said claw plate, and means for biasing said second link at a point intermediate its ends against a fixed abutment.

5. Film feeding mechanism comprising a claw plate having claws at one end thereof, a crank rotatable once per picture frame pivotally connected with the other end of the claw plate, a first link pivotally connected at one end to the crank, an arm pivotally connected at one end to said first link at a point intermediate the ends thereof and at the other end to an abutment, a second link pivotally connected at one end to the other end of the first link, spring means biasing said second link into engagement with an abutment at a point intermediate its ends, and a third link pivotally connected at one end to the other end of the second link and at its other end to the claw plate.

6. Film feeding mechanism as claimed in claim 5, wherein the stroke of the crank is approximately 1.3 times the advance of film in one operation of the claw, and the length of the first link between the points of connection of the arm and the second link is not greater than ⅔rds of the stroke of the crank.

7. Film feeding mechanism as claimed in claim 5 including means for adjusting the position of the abutment to which said arm is connected.

8. In an assembly of the character described, a single uniformly rotating crank, a claw plate pivotally connected to the free end of said crank, a claw tooth at the free end of said claw plate, and a single auxiliary lever rod operatively connected at opposite ends thereof to said crank and claw plate whereby the swinging movement imparted to said rod by rotation of the crank is transmitted to said claw plate so that said claw tooth is constrained to effect a predetermined motion.

9. An assembly as defined in and claimed by claim 8, further characterized in that the operative connection between the lever rod and the claw plate is defined by an arm pivotally secured to the end of the lever rod and to the claw plate, and spring means cooperating with the claw plate, so that the swinging movement transmitted to the claw plate is under spring tension adjacent the claw tooth.

References Cited in the file of this patent

UNITED STATES PATENTS

| | | |
|---|---|---|
| 2,018,812 | Schmidt | Oct. 29, 1935 |
| 2,090,798 | Lingg | Aug. 24, 1937 |